US007006471B1

(12) United States Patent
Iverson et al.

(10) Patent No.: US 7,006,471 B1
(45) Date of Patent: Feb. 28, 2006

(54) OPTIMIZATION OF BEARER TRAFFIC IN RADIO NETWORKS

(75) Inventors: Kent Iverson, Hermosa Beach, CA (US); Mallikarjun Tatipamula, San Jose, CA (US); Dana Blair, Alpharetta, GA (US); Matthew Macpherson, Aurora, IL (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

(21) Appl. No.: 09/648,865

(22) Filed: Aug. 25, 2000

(51) Int. Cl.
*H04Q 7/00* (2006.01)

(52) U.S. Cl. .................... 370/331; 370/335; 455/439

(58) Field of Classification Search ............... 370/329, 370/390, 331; 455/453, 439, 458
See application file for complete search history.

(56) References Cited

U.S. PATENT DOCUMENTS

| 5,103,461 | A | | 4/1992 | Tymes ............................. 375/1 |
|---|---|---|---|---|
| 5,349,463 | A | | 9/1994 | Hirohashi et al. ........... 359/174 |
| 5,606,729 | A | | 2/1997 | D'Amico et al. ........... 455/67.1 |
| 5,623,484 | A | | 4/1997 | Muszynski .................... 370/335 |
| 5,721,754 | A | | 2/1998 | Chen ............................ 375/227 |
| 5,832,300 | A | | 11/1998 | Lowthert ....................... 395/853 |
| 5,856,804 | A | | 1/1999 | Turcotte et al. .............. 342/371 |
| 5,884,177 | A | * | 3/1999 | Hanley ........................ 455/439 |
| 5,937,019 | A | * | 8/1999 | Padovani ...................... 375/358 |
| 5,949,773 | A | * | 9/1999 | Bhalla et al. ................ 370/331 |
| 6,055,427 | A | * | 4/2000 | Ojaniemi ..................... 455/436 |
| 6,058,107 | A | * | 5/2000 | Love et al. .................. 370/332 |
| 6,097,954 | A | * | 8/2000 | Kumar et al. ................ 455/442 |
| 6,141,347 | A | * | 10/2000 | Shaughnessy et al. ....... 370/390 |
| 6,141,388 | A | | 10/2000 | Servais et al. ............... 375/262 |
| 6,230,013 | B1 | * | 5/2001 | Wallentin et al. ........... 455/436 |
| 6,252,862 | B1 | * | 6/2001 | Sauer et al. ................. 370/331 |
| 6,324,409 | B1 | | 11/2001 | Shaffer et al. ............... 455/552 |
| 6,353,742 | B1 | * | 3/2002 | Bach ........................... 455/453 |
| 6,438,378 | B1 | * | 8/2002 | Kouno ......................... 455/439 |
| 6,445,916 | B1 | * | 9/2002 | Rahman ....................... 455/423 |
| 6,519,457 | B1 | * | 2/2003 | Jiang et al. .................. 455/442 |
| 6,590,879 | B1 | * | 7/2003 | Huang et al. ................ 370/331 |
| 6,597,698 | B1 | * | 7/2003 | Lundback et al. ........... 370/398 |
| 2001/0026541 | A1 | * | 10/2001 | You et al. .................... 370/331 |
| 2001/0036834 | A1 | * | 11/2001 | Das et al. .................... 455/458 |
| 2001/0038616 | A1 | * | 11/2001 | Fong et al. .................. 370/329 |
| 2002/0034166 | A1 | * | 3/2002 | Barany et al. ............... 370/329 |
| 2002/0072382 | A1 | * | 6/2002 | Fong et al. .................. 455/507 |
| 2003/0086378 | A1 | * | 5/2003 | Chen et al. .................. 370/252 |

OTHER PUBLICATIONS

3GPP Organizational Partners, "3$^{rd}$ Generation Partnership Project; Technical Specification Group Radio Access Network; UTRAN Overall Description (Release 1999)", Technical Specification 3G TS 25.401 V3.3.0 (Jun. 2000).

* cited by examiner

*Primary Examiner*—Steven Nguyen
*Assistant Examiner*—Clemence Hab
(74) *Attorney, Agent, or Firm*—Baker Botts L.L.P.

(57) ABSTRACT

A selection and distribution unit (SDU) in a wireless radio access network is configured to receive signal quality information about a plurality of data streams, and based on the signal quality information, to select one of the plurality of data streams to be forwarded independently of the SDU. The data streams are associated with a call session from a mobile device and received by base transceiver stations, which provide the signal quality information about the received data streams to the SDU. Only one data stream is selected by the SDU for forwarding to a network device such as a PSTN gateway. The SDU provides a multicast address to the network device for transmitting data streams to the mobile device, and commands a base transceiver station to listen at that multicast address to receive the data stream. The SDU also establishes a multicast address for a plurality of base transceiver stations to receive commands from the SDU.

18 Claims, 3 Drawing Sheets

OPTIMIZATION OF BEARER TRAFFIC IN RADIO NETWORKS

TECHNICAL FIELD OF THE INVENTION

The present invention relates to wireless communication systems and more particularly to delivering voice data and control/signaling information in an Internet Protocol (IP) based Code Division Multiple Access (CDMA) radio access network.

BACKGROUND OF THE INVENTION

Typical cellular systems include base transceiver stations that provide wireless communications for mobile devices such as cellular phones. These base transceiver stations connect to base station controllers and transmit phone calls and other data using circuit-switched, time division multiplexed communications protocols. The connections between base transceiver stations and base station controllers typically support multiple communications sessions by assigning each session to a particular time-slot within frames. Thus, multiple cell phones may simultaneously establish communications sessions via one base transceiver station, and the base transceiver station uses different time-slots for each session. The management and assignment of time-slots often requires complex algorithms making tradeoffs based on a variety of factors. As the number of cell phones increases in a given area, proper management of time-slots becomes critical.

The roaming of a cell phone between base transceiver stations during a communications session exacerbates problems in time-slot management. An established session roaming to a new base transceiver station typically requires a similar time-slot on both the original and the new base transceiver stations. Therefore, time division multiplexed connections may result in inefficient use of bandwidth between base transceiver stations and base station controllers, and introduces complexity to time-slot management and roaming decisions for cell phones.

SUMMARY OF THE INVENTION

Briefly, therefore, this invention provides for a method, article of manufacture, and apparatus for processing packets in a wireless radio access network. A packet processing system in accordance with the invention comprises a controller in the form of a selection and distribution unit (SDU) configured to process radio bearer signal quality information and select data streams for forwarding independently of the SDU, based on the signal quality information.

In a further embodiment, a selection and distribution unit (SDU) in a wireless radio access network is configured to receive signal quality information about a plurality of data streams, and based on the signal quality information, to select one of the plurality of data streams to be forwarded independently of the SDU. The data streams are associated with a call session from a mobile device and received by base transceiver stations, which provide the signal quality information about the received data streams to the SDU. Only one data stream is selected by the SDU for forwarding to a network device such as a PSTN gateway. The SDU provides a multicast address to the network device for transmitting data streams to the mobile device, and commands a base transceiver station to listen at that multicast address to receive the data stream. The SDU also establishes a multicast address for a plurality of base transceiver stations to receive commands from the SDU.

A further understanding of the nature and advantages of the inventions herein may be realized by reference to the remaining portions of the specification and the attached drawings.

DESCRIPTION OF SPECIFIC EMBODIMENTS

Generally, the packet processing and management techniques of the present invention may be implemented in software and/or hardware. For example, they can be implemented in an operating system kernel, in separate user processes, in a library package bound into a network application, on a specially constructed machine, or on a network interface card. In a specific embodiment of this invention, these techniques may be implemented in software such as an operating system or in an application running on an operating system.

A software or software/hardware hybrid packet processing and management system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay, ISDN (Integrated Services Digital Network), and wireless (air) interfaces, for example. Specific examples of such network devices include controllers, switches, and transceivers. For example, the packet processing and management systems of this invention may operate on specially configured devices such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
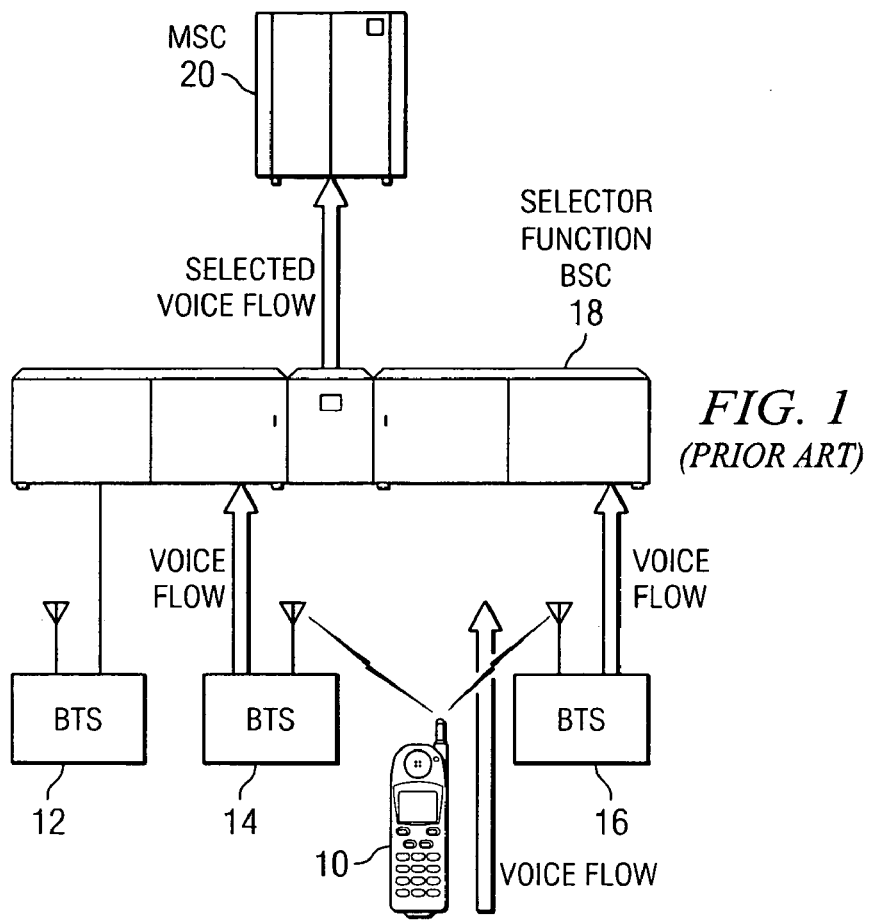
FIG. 1 is a simplified diagram of a second generation radio access network.

In an embodiment of a CDMA wireless system, voice data and control/signaling information from a single mobile device (which may be a mobile phone, laptop, or other device that is transmitting and receiving data) are received by one or more Base Transceiver Stations (BTS). As shown in FIG. 1, which illustrates a second generation radio access network, multiple BTS cells may be in range of the mobile device, and may be selected to deliver simultaneous duplicate data streams (voice bearer data flows) to a Base Station Controller (BSC). Each voice bearer data flow contains in-band signaling information about the nature of that particular set of data, because the BTS combines the voice sample received over the radio interface with information about the signal quality, power level, and other collateral information that can be used by the BSC to make a selection decision among parallel data streams.

The BSC incorporates a Selection/Distribution function that chooses the best data stream from the multiple incoming streams by using an algorithm that considers the in-band signaling information embedded in the voice flow by the BTS, and typically does not reference the voice sample data itself. The "best" data stream is then forwarded to the destination Public Switched Telephone Network (PSTN) via a Mobile Switching Center (MSC), and the duplicate data streams are discarded. The BSC may receive as many as six simultaneous flows for a given mobile device session.

Because multiple data streams are delivered to the BSC by the selected BTS cells in communication with the mobile device, the BTS to BSC backhaul connections must have sufficient capacity to handle the transmission of voice traffic multiple times across the network. Backhaul connections are typically implemented using time division multiplexing (TDM) of multiple data streams over leased lines such as T1/E1 lines. These lines are costly, and transmission of multiple copies of a single voice flow significantly reduces available capacity for transmitting more voice flows from additional mobile devices.

One solution found in GSM and TDMA cellular networks is to use hard handoff between BTS cells, in which only one BTS is in communication with the mobile device at a time. However, this requires precise synchronization of the mobile device, the BTS cells, and the BSC for proper voice flow handoff as the mobile device moves from cell to cell. The voice quality is dependent on a singular voice flow from the mobile device to the BTS and to the BSC and thus is widely variable. There is also a risk of premature call drops due to the mistiming or instantaneous interference at the point of signal transition between cells.

CDMA technology using multipath redundant voice flows mitigates these issues by allowing "make before break" signaling and bearer transitions over the air between a mobile device and the BTS. Multiple redundant flows allow a "Best of" approach to signal quality for voice call applications. However, this may produce high traffic as described above.

Figure 4:
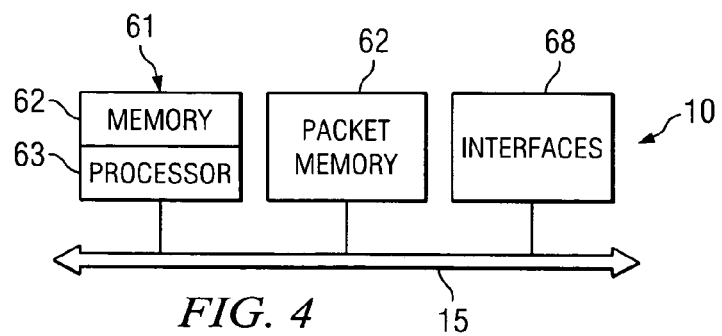
FIG. 4 is a simplified diagram of router hardware suitable for implementing one embodiment of the present invention.

Referring now to FIG. 4, a router 10 suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system (e.g., a version of the Internetwork Operating Systems (IOS®) of Cisco Systems, Inc.) and any appropriate applications software. CPU 61 may include one or more processors 63 such as a processor from the Motorola family or MIPS family of microprocessors. In an alternative embodiment, processor 63 is specially designed hardware for controlling the operations of router 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 10 may further include a packet memory 72 for intermediate storage of packets being forwarded by router 10.

Although the system shown in FIG. 4 is one specific router of the present invention, it is by no means the only architecture on which the present invention can be implemented. For example, an architecture having a single processor that handles communications as well as routing computations, etc. is often used. Further, other types of interfaces and media could also be used with the router.

Regardless of a network device's configuration, it may employ one or more memories or memory modules (including memory 62) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The invention will be described in terms of its application to voice data flows and CDMA networks, but one skilled in the art will recognize that the concepts and methods of the present invention have applicability in other respects, such as data (whether in streaming or packet form) flows and wideband CDMA (WCDMA) and other types of networks, and the disclosure hereof is intended to cover all such applications.

Figure 2:
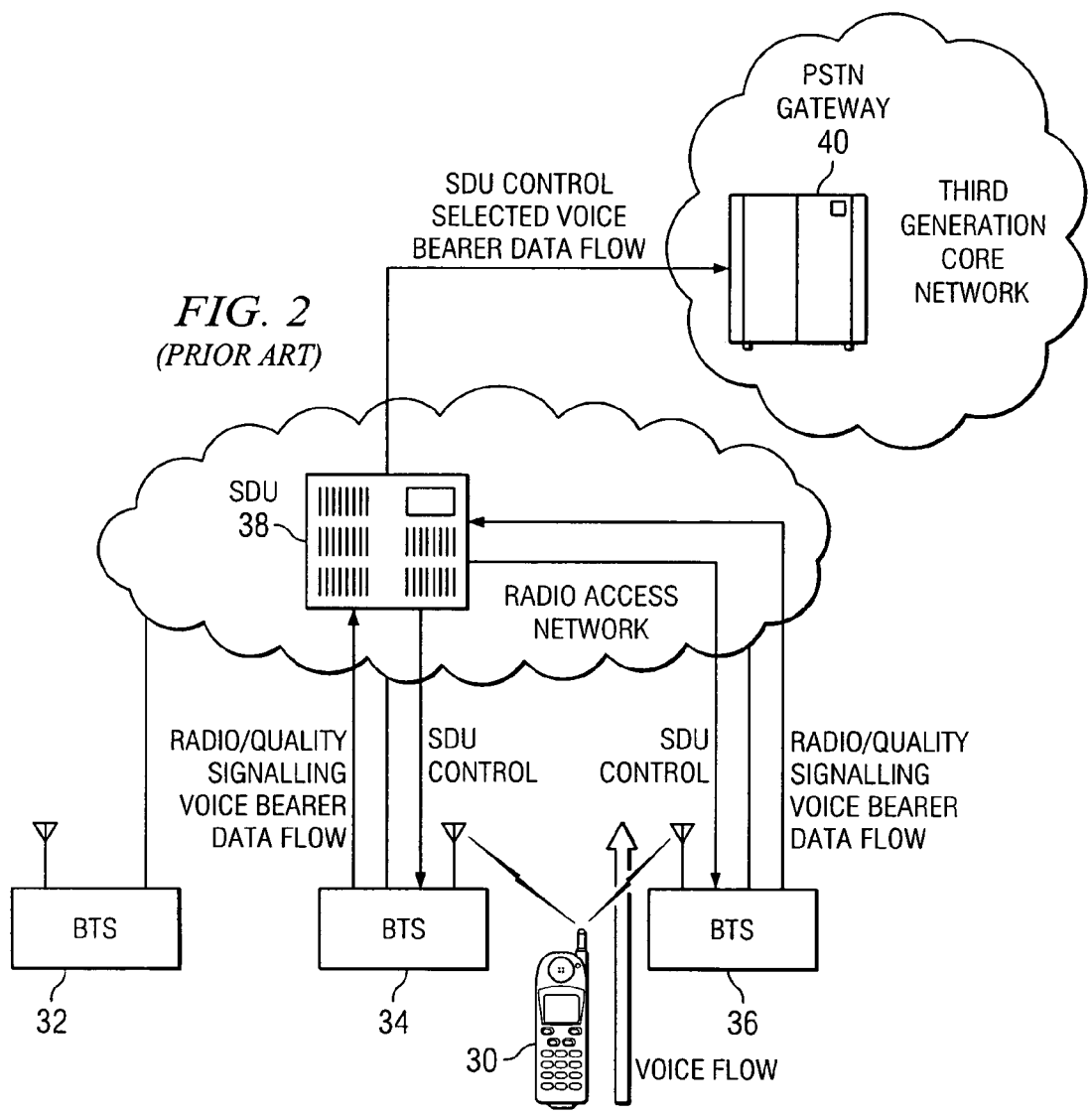
FIG. 2 is a simplified diagram of a third generation radio access network.

Referring now to FIG. 2, a wireless access network includes a mobile device 30, BTS cells 32, 34, and 36, a controller in the form of Selection and Distribution Unit (SDU) 38, and PSTN gateway 40, in a configuration in accordance with third generation wireless access networks. The functions of the SDU 38 may be embodied in a router 10 as described above, incorporated in another type of network device, or distributed among several network devices. Details of a 3G wireless access network may be seen from reference to Technical Specification 3G TS 25.401 V3.3.0 (2000-06), the disclosure of which is hereby incorporated by reference, published by the 3$^{rd}$ Generation Partnership Project (3GPP) and available at www.3gpp.org.

When acting under the control of appropriate software or firmware, the SDU 38 is responsible for such selection/control tasks as network management, BTS selection and control, reception and transmission of data flow, directing the selected data flow to and from the PSTN gateway 40 and other network devices, and general processing of data. It preferably accomplishes all these functions under the control of software including an operating system (e.g., a version of the Internetwork Operating Systems (IOS®) of Cisco Systems, Inc.) and any appropriate applications software.

The SDU 38 selects the BTS cells that have bearer data flows allocated to be in communication with the mobile device 30 as the mobile device 30 moves within the wireless network, based on information about such things as signal strength, signal quality, predicted position, etc. In the example shown in FIG. 2, the selected BTS cells are 34 and 36. BTS 32 has not been selected and does not have any dedicated or common radio bearer channels allocated for communication with the mobile device. The mobile device 30 listens to common pilot channels that are broadcast by all BTS's (including BTS 32) and reports the identity and signal strength of those BTS's to the SDU. The list of BTS's reported will include those that are not currently configured to establish common or dedicated bearer radio channel communication with the mobile device 30 such as BTS 32. Mobile device 30 may or may not be in communication with BTS 32. If the mobile device 30 assists with handoff by sending back signal information to SDU 38, some of that information may be information that the mobile device 30 receives from BTS 32. Mobile device 30 communicates with BTS 34 and 36 via an air interface.

All BTS 32, 34, and 36 are in communication with the SDU 38 in the radio access network via leased lines such as T1/E1 lines that connect the BTS to the network. Communication between the BTS and SDU 38 may be performed by conventional networking means using TCP/IP or other protocol. Multiple communications on a single T1/E1 line are multiplexed in a TDM scheme. BTS 34 and 36 combine the voice data received over the air interface with information about the signal quality, power level, and other collateral information that can be used by the SDU 38 to make a selection decision among parallel data streams. BTS 34 and 36 transmit this combined control/signaling information in-band with the voice data flow to SDU 38. SDU 38 uses the in-band control/signaling in the data streams to select a data stream to forward to PSTN gateway 40, and transmits the selected data stream to the PSTN gateway 40. In the reverse direction, when a data stream is received from the PSTN gateway 40 for transmission to mobile device 30, the SDU 38 distributes replicated copies of this data stream to all BTS's that have configured radio channels with the mobile device. All BTS's that have radio bearer channels allocated for downstream communication to the mobile device 30 will receive the signal from the SDU 38, and the mobile device 30 will choose the best signal from the BTS's.

In the foregoing configuration depicting a third generation (3G) wireless access network, all voice bearer flows are transported from the BTS cells to the SDU 38, which then forwards the selected voice bearer flow to the PSTN. This parallels equivalent bearer flows in second generation wireless access networks. As a result, in some implementations, voice flows for a given mobile device may traverse the network multiple times, with redundant voice flows eliminated at the SDU 38. This results in a large amount of traffic being transported across the wireless access network that is simply being discarded at a common endpoint. Additionally, processing by the SDU 38 increases latency in the voice flow transmission.

Figure 3:
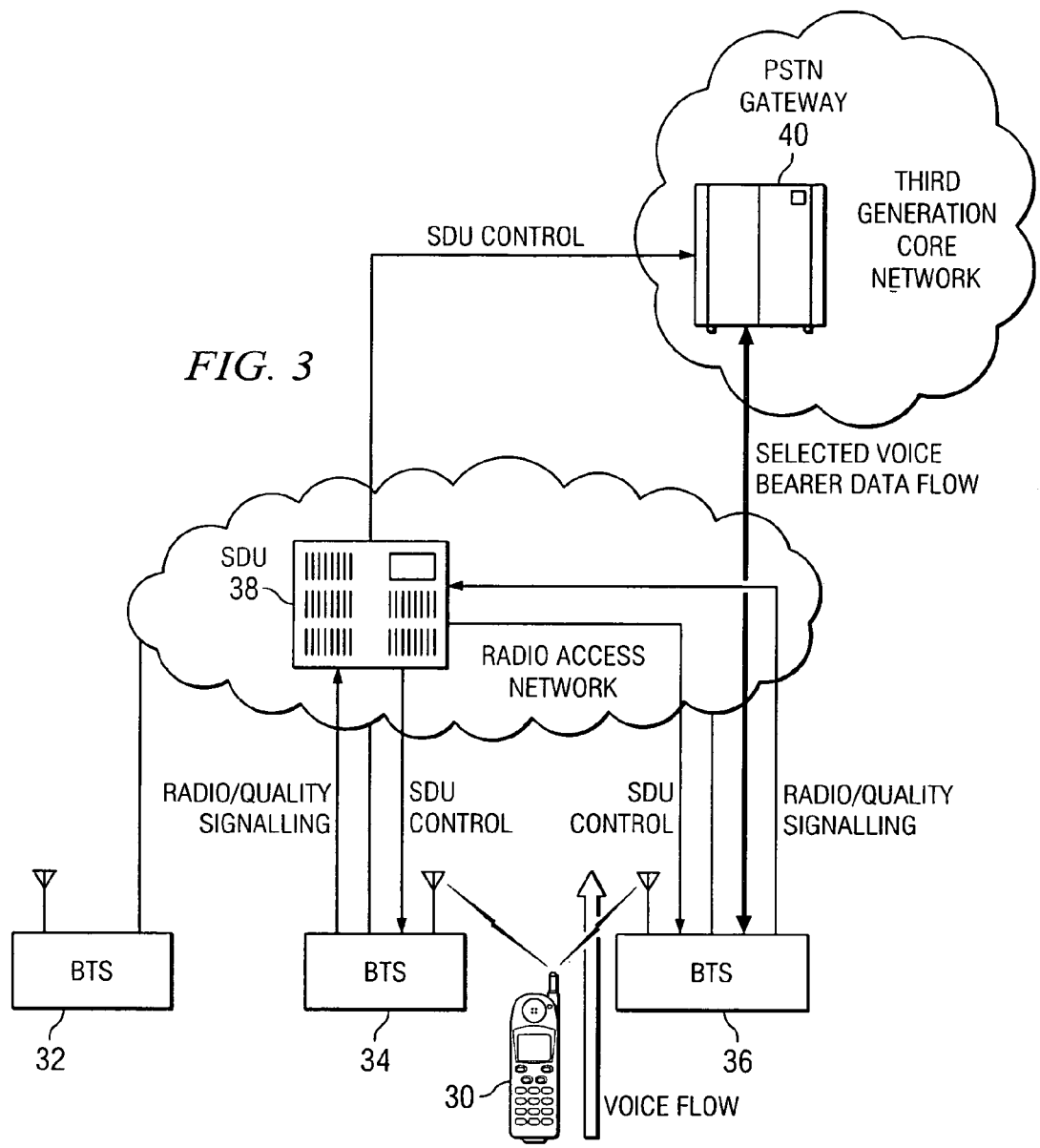
FIG. 3 is a simplified diagram of a third generation radio access network in accordance with the invention.

In accordance with the invention, therefore, FIG. 3 depicts an improved third generation wireless access network, comprising mobile device 30, nodes in the form of BTS 32, 34, 36, a controller in the form of SDU 38, and a destination in the form of PSTN gateway 40. BTS 32, 34, 36 communicate with the SDU and the radio access network via T1/E1 or other low-bandwidth lines, typically via the network using IP packet routed transmission techniques. Each BTS may have its own line or share a line with others. SDU 38 uses information provided by the mobile device 30 about signal strength, signal quality, predicted position, etc. to select the BTS cells to be in communication with the mobile device 30 to handle the call session as the mobile device 30 moves within the wireless network. It should be understood that the functions of the SDU 38 may be incorporated in a single controller or distributed among multiple devices in the network, as may the functions of other devices in the network.

In FIG. 3, BTS 32 has not been selected, and while it may be within radio receiving range of the signal transmitted by the mobile device 30, it does not allocate radio receiver resources or back haul bandwidth to that signal. Downlink traffic from each BTS 32, 34, or 36 uses a distinct Walsh code so the mobile device 30 can distinguish between multiple incoming signals. In addition, a BTS may modify physical transmission characteristics such as signal polarization and power factor to limit signal visibility to a mobile device. On the uplink, the mobile device 30 transmits using a single Walsh code, and the received information is relayed to the SDU 38 by BTS's that have been instructed to do so. The BTS's identify the source of the data as the mobile device 30. The SDU 38 distinguishes between identical incoming signals by the combination of the originating BTS identity and the mobile device identity. Only BTS 34 and 36 are selected to be in the active cell group associated with mobile device 30. BTS cells 34 and 36 have allocated over the air radio resources (radio bearer channels) for transmission and reception of user data from the mobile device 30, though only BTS 36 is selected to transmit the voice flow to the network and ultimately to the PSTN gateway 40. Generally, if a BTS has dedicated radio bearer channels allocated in the radio interface uplink, they are also dedicated in the downlink, and the downlink traffic is broadcast to the mobile device 30 from all configured BTS's. Thus, BTS 34 and 36 both receive and transmit to the mobile device 30. BTS 34 can still collect data about signal strength and quality for use by the SDU 38, as does BTS 36. In addition, BTS 36 takes the actual radio bearer information and after receiving the network address of the PSTN gateway 40 or other chosen endpoint from the SDU 38, sends it to the selected destination.

Based on information used to select BTS 34 and 36 to receive the voice flow from mobile device 30, SDU 38 selects BTS 36 to transmit the voice flow from the call session to the network. Typically, this is the voice flow that gives the best signal quality, but the selection may also be based on other considerations (such as prioritized quality of service assignment, traffic type. and BTS load). Mobile device 30 transmits, via an air interface, a voice bearer data flow that is received by selected BTS cells 34, 36, and 32. BTS 32 has no resources allocated to reception of traffic from mobile device 30 and so does not forward anything about the traffic. BTS 34 and 36 deliver information about the radio and signal quality of the voice flow to SDU 38, and may be configured to do so continuously or when polled at intervals or when there is a significant change in quality with pre-configured thresholds selected to reduce control/signaling traffic. This control/signaling information is packetized by BTS 34 and 36 before being sent to SDU 38. BTS 36 transmits the voice data flow via the access network to PTSN gateway 40 or other destination specified by the SDU 38 in a control message, bypassing SDU 38. Thus, BTS 36 communicates with PSTN 40 independently of SDU 38 after SDU 38 has selected BTS 36 to provide the data flow. BTS 34 (the remaining BTS associated with the active cell group for this particular mobile device 30) does not forward the voice flow, and instead may discard it.

Figure 5:
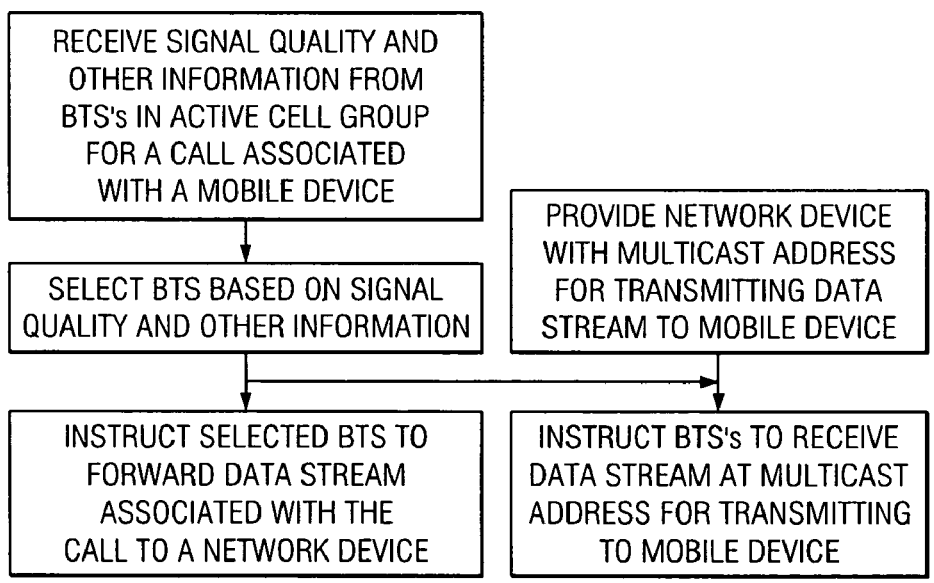
FIG. 5 is a flowchart describing steps of according to one embodiment of the present invention.

For flows from the network to the mobile device 30, the PSTN gateway 40 or other network device may use a multicast address associated with the mobile device 30. This multicast address is provided by the SDU 38. Based on the radio and signal quality information being received from BTS cells associated with the mobile device 30, the SDU 38 sends a control message to one or more BTS cells to join the multicast group to receive the flow from the network. The BTS cells in the multicast group are each configured to transmit the flow to the mobile device 30, which can then choose the highest quality signal. The use of multicasting reduces the latency in the flow, since SDU 38 no longer performs the packet replication for the downlink flow. FIG. 5 illustrates some of the steps performed by SDU 38.

In addition, the control/signal messaging may be simplified through the use of multicast groups, thus allowing a single control message to be propagated to all BTS cells associated with a given mobile device 30. The messaging protocol from the SDU 38 to the BTS cells 32, 34, 36 can be constructed such that a single message from the SDU 38 can provide selection/deselection information to all associated BTS cells. The list of associated BTS cells that are affected can be managed and changed on a packet by packet basis.

One skilled in the art will recognize that there are many advantages to the invention. Current designs for BTS connections to the access network are centered around leased lines such as T1/E1 lines, which are costly. By reducing parallel voice flows from the BTS cells to/from the network across the backhaul leased lines, precious bandwidth is conserved and usage becomes more efficient. Only voice bearer flows that need to be delivered are transmitted over the backhauls, and multicasting enables transmission of a single flow to be received by BTS cells in the multicast group.

Further, bearer traffic carried by the access network is significantly reduced, because the voice bearer flow travels directly from the selected BTS 36 to the PSTN gateway 40 or other destination, bypassing the SDU 38. The use of multicast groups for flows destined for the mobile device 30 also reduces traffic in the access network as well as across the BTS backhaul lines.

A further advantage of the invention is that latency in delivery of voice data to the PSTN gateway 40 or other destination is reduced, because no intermediate processing by the SDU 38 takes place and the transit time to the SDU 38 is eliminated. Similarly, latency is reduced by the use of multicasting by the PSTN gateway 40 or other originator to transmit flows to BTS cells in the multicast group, without intermediate processing by the SDU 38.

It is understood that the examples and embodiments described herein are for illustrative purposes only and that various modifications and changes in light thereof will be suggested to persons skilled in the art and are to be included within the spirit and purview of this application and scope of the appended claims and their full scope of equivalents. For example, the invention is not limited to voice data flows, and may be applied to other kinds of data flows. This invention may be applied to all CDMA or WCDMA 3G wireless access networks implementing an SDU function. Various devices have been described according to their functions for the sake of clarity, and one skilled in the art will realize that their functions may be distributed among other components in the network. Therefore, it is intended that the disclosure and claims apply to all such other embodiments as if fully set forth herein. All publications, patents, and patent applications cited herein are hereby incorporated by reference.

The invention claimed is:

1. An apparatus, comprising:
a selection and distribution unit that is included within a base station controller, the selection and distribution unit being operable to:
(a) receive signal quality information from a plurality of base transceiver stations about a plurality of data streams that are associated with a plurality of mobile stations which are capable of moving within a wireless network;
(b) select one of the plurality of data streams associated with a selected one of the mobile stations to be forwarded to a next destination, the selected data stream being chosen based on at least a power level and a signal quality of the selected data stream; and
(c) direct reverse communication traffic associated with the selected mobile station to a selected one or more of the plurality of base transceiver stations, wherein the selection and distribution unit determines which base transceiver station is to accommodate an associated communication session based on at least a signal strength associated with the selected mobile station, a signal quality associated with the mobile station, and a predicted position associated with the selected mobile station.

2. The apparatus as recited in claim 1, wherein the data streams are associated with the communication session from the selected mobile station, and the selection and distribution unit is configured to select only one data stream to be forwarded.

3. The apparatus as recited in claim 2, wherein the data streams are associated with a plurality of call sessions from the mobile stations, and the selection and distribution unit is configured to select only one data stream to be forwarded for each call session.

4. The apparatus as recited in claim 1, wherein the data stream comprises packets using an internet protocol.

5. The apparatus as recited in claim 1, further configured to provide a multicast address to the next destination for transmitting a data stream.

6. The apparatus as recited in claim 5, further configured to instruct a selected one of the base transceiver stations to receive the data stream at the multicast address.

7. The apparatus as recited in claim 6, wherein the data stream comprises packets using an internet protocol.

8. The apparatus as recited in claim 1, further configured to establish a multicast address for issuing commands to the plurality of base transceiver stations.

9. A method for processing packets, comprising the steps of:
receiving signal quality information from a plurality of base transceiver stations about a plurality of data streams that are associated with a plurality of mobile stations which are capable of moving within a wireless network;

selecting one of the plurality of data streams associated with a selected one of the mobile stations to be forwarded to a next destination, the selected data stream being chosen based on at least a power level and a signal quality of the selected data stream; and directing reverse communication traffic associated with the selected mobile station to a selected one or more of the plurality of base transceiver stations, wherein a selection and distribution unit determines which base transceiver station is to accommodate an associated communication session based on at least a signal strength associated with the selected mobile station, a signal quality associated with the mobile station, and a predicted position associated with the selected mobile station.

10. A computer program product for processing packets, comprising a computer usable medium having machine readable code embodied therein for performing the steps of:

receiving signal quality information from a plurality of base transceiver stations about a plurality of data streams that are associated with a plurality of mobile stations which are capable of moving within a wireless network;

selecting one of the plurality of data streams associated with a selected one of the mobile stations to be forwarded to a next destination, the selected data stream being chosen based on at least a power level and a signal quality of the selected data stream; and directing reverse communication traffic associated with the selected mobile station to a selected one or more of the plurality of base transceiver stations, wherein a selection and distribution unit determines which base transceiver station is to accommodate an associated communication session based on at least a signal strength associated with the selected mobile station, a signal quality associated with the mobile station, and a predicted position associated with the selected mobile station.

11. A system for a packet processing system, comprising:

means for receiving signal quality information from a plurality of base transceiver stations about a plurality of data streams that are associated with a plurality of mobile stations which are capable of moving within a wireless network;

means for selecting one of the plurality of data streams associated with a selected one of the mobile stations to be forwarded to a next destination, the selected data stream being chosen based on at least a power level and a signal quality of the selected data stream; and means for directing reverse communication traffic associated with the selected mobile station to a selected one or more of the plurality of base transceiver stations, wherein a selection and distribution unit determines which base transceiver station is to accommodate an associated communication session based on at least a signal strength associated with the selected mobile station, a signal quality associated with the mobile station, and a predicted position associated with the selected mobile station.

12. The system as recited in claim 11, wherein the data streams are associated with the communication session from the selected mobile station, and the means for selecting is configured to select only one data stream to be forwarded.

13. The system as recited in claim 12, wherein the data streams are associated with a plurality of call sessions from the mobile station, and the means for selecting is configured to select only one data stream to be forwarded for each call session.

14. The system as recited in claim 12, wherein the data stream comprises packets using an internet protocol.

15. The system as recited in claim 12, further comprising means for providing a multicast address to the next destination for transmitting a data stream.

16. The system as recited in claim 15, further comprising means for instructing a selected one of the base transceiver stations to receive the data stream at the multicast address.

17. The system as recited in claim 16, wherein the data stream comprises packets using an internet protocol.

18. The system as recited in claim 12, further comprising means for establishing a multicast address for issuing commands to the plurality of base transceiver stations.

* * * * *

UNITED STATES PATENT AND TRADEMARK OFFICE
CERTIFICATE OF CORRECTION

PATENT NO. : 7,006,471 B1
APPLICATION NO. : 09/648865
DATED : February 28, 2006
INVENTOR(S) : Kent Iverson et al.

It is certified that error appears in the above-identified patent and that said Letters Patent is hereby corrected as shown below:

Column 10, Line 29, after "recited in claim", delete "12", and insert -- 11 --.
Column 10, Line 31, after "recited in claim", delete "12", and insert -- 11 --.
Column 10, Line 40, after "recited in claim", delete "12", and insert -- 11 --.

Signed and Sealed this

Seventeenth Day of April, 2007

JON W. DUDAS
*Director of the United States Patent and Trademark Office*